United States Patent
Inoue

(10) Patent No.: US 9,525,374 B2
(45) Date of Patent: Dec. 20, 2016

(54) MOTOR DRIVING CIRCUIT, ELECTRONIC DEVICE USING THE SAME, AND DRIVING METHOD THEREOF

(71) Applicant: ROHM CO., LTD, Kyoto (JP)

(72) Inventor: Shigeyuki Inoue, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 322 days.

(21) Appl. No.: 14/193,990

(22) Filed: Feb. 28, 2014

(65) Prior Publication Data

US 2014/0239874 A1 Aug. 28, 2014

(30) Foreign Application Priority Data

Feb. 28, 2013 (JP) .................................. 2013-038824

(51) Int. Cl.
H02P 8/38 (2006.01)
H02P 6/18 (2016.01)

(52) U.S. Cl.
CPC .................. H02P 8/38 (2013.01); H02P 6/182 (2013.01)

(58) Field of Classification Search
CPC .................................. H02P 8/38; H02P 6/182
See application file for complete search history.

(56) References Cited

U.S. PATENT DOCUMENTS

| | | | | |
|---|---|---|---|---|
| 4,496,984 A * | 1/1985 | Stoffel | .................. | H04N 1/0057 358/296 |
| 5,396,869 A * | 3/1995 | Suzuki | .................... | F02D 11/10 123/361 |
| 5,446,358 A * | 8/1995 | Nakata | ...................... | G05F 1/70 318/567 |
| 6,121,736 A * | 9/2000 | Narazaki | ................. | H02P 6/085 318/400.02 |
| 2009/0066278 A1* | 3/2009 | Arisawa | ..................... | H02P 8/34 318/400.35 |
| 2010/0188036 A1* | 7/2010 | Hioki | ..................... | G05B 19/40 318/685 |
| 2010/0225263 A1* | 9/2010 | Mishima | ................... | H02P 7/29 318/430 |

(Continued)

FOREIGN PATENT DOCUMENTS

| | | |
|---|---|---|
| JP | 09-103096 A | 4/1997 |
| JP | 2000184789 A | 6/2000 |

(Continued)

*Primary Examiner* — Shawki S Ismail
*Assistant Examiner* — Muhammad S Islam
(74) *Attorney, Agent, or Firm* — Cantor Colburn LLP

(57) ABSTRACT

A motor driving circuit for driving a step motor includes a logical circuit synchronized with a step pulse signal to control a bridge circuit connected to a coil of the step motor and control electric power supplied to the coil of the step motor, a counter electromotive force detecting unit configured to detect a counter electromotive force generated between both ends of the coil, and a step-out predicting unit configured to assert a detection signal indicating a sign of step-out of the step motor, when the counter electromotive force detected at a detection time after the lapse of a time calculated by multiplying a predetermined coefficient to a length of a high impedance period of the coil since transition to the high impedance period is lower than a predetermined threshold voltage.

15 Claims, 6 Drawing Sheets

(56) References Cited

U.S. PATENT DOCUMENTS

| | | | |
|---|---|---|---|
| 2011/0068732 A1* | 3/2011 | Hioki | H02P 6/187 |
| | | | 318/696 |
| 2011/0156624 A1* | 6/2011 | Takai | H02P 6/182 |
| | | | 318/400.04 |

FOREIGN PATENT DOCUMENTS

| | | |
|---|---|---|
| JP | 2004120957 A | 4/2004 |
| JP | 2004180354 A | 6/2004 |

\* cited by examiner

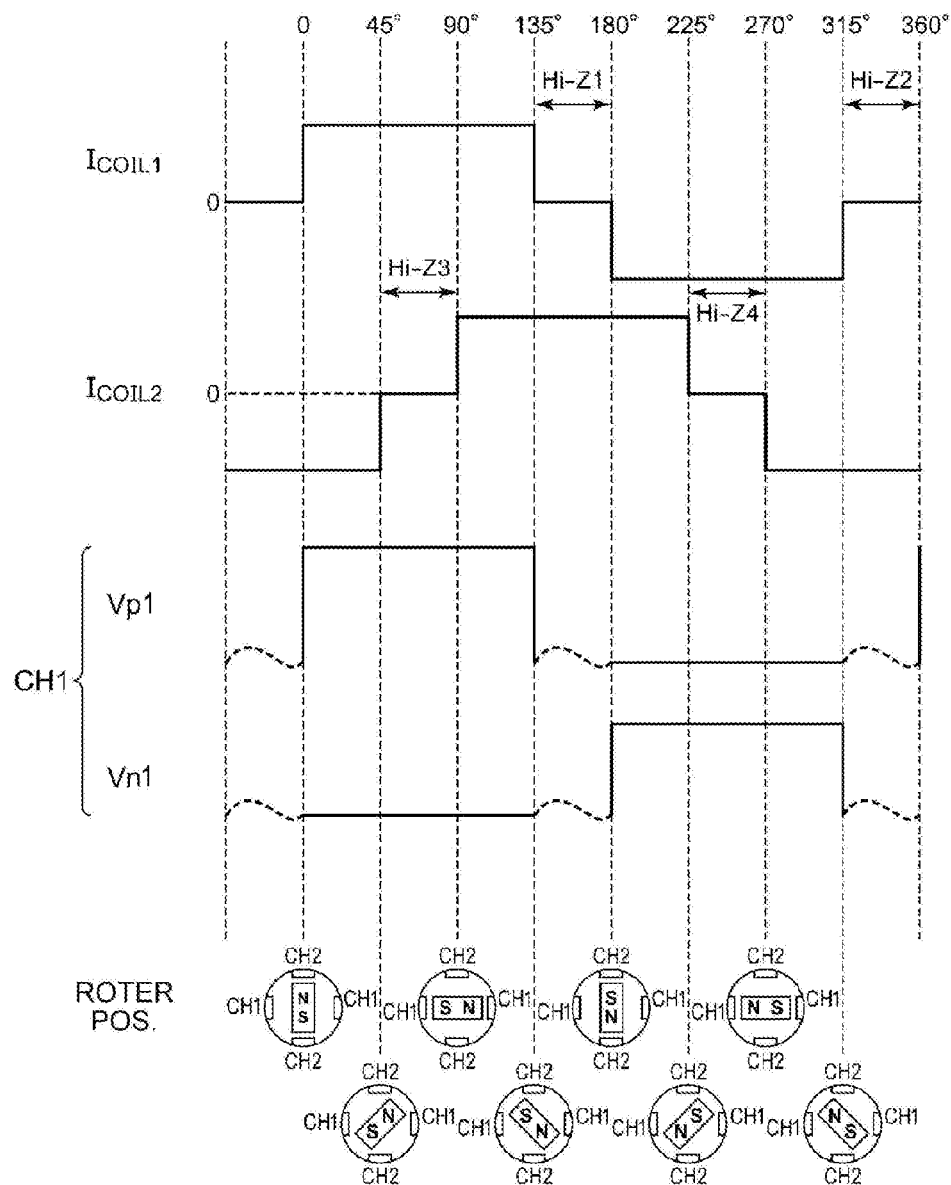

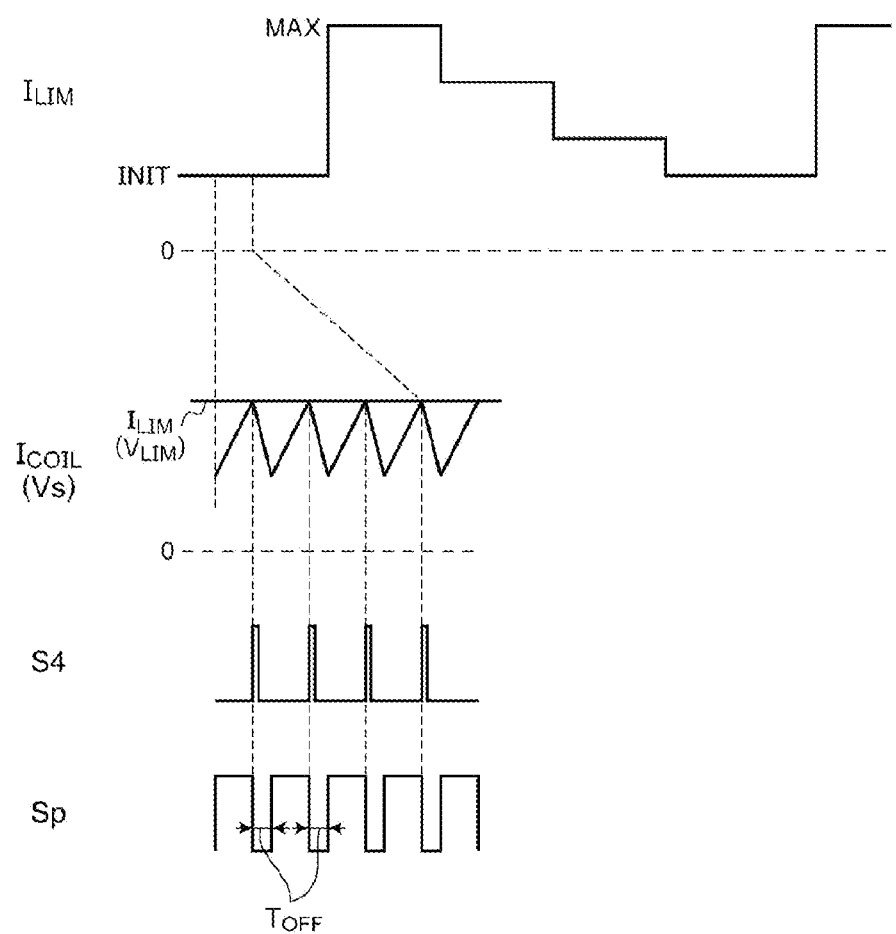

MOTOR DRIVING CIRCUIT, ELECTRONIC DEVICE USING THE SAME, AND DRIVING METHOD THEREOF

CROSS-REFERENCE TO RELATED APPLICATION

This application is based upon and claims the benefit of priority from Japanese Patent Application No. 2013-38824, filed on Feb. 28, 2013, the entire contents of which are incorporated herein by reference.

TECHNICAL FIELD

The present disclosure relates to a technique for driving a step motor.

BACKGROUND

Step motors are commonly used to adjust a position of a lens or a movable component such as a pickup or a head, drive a paper transfer roller, or the like, in electronic devices such as digital cameras, digital video cameras, disk devices, printers, or copy machines. Step motors, which are synchronous motors rotating in synchronization with a step pulse signal applied from the outside, have excellent controllability in terms of startup, stop, and position determining. In addition, step motors have characteristics that they can be controlled in an open loop and are appropriate to process digital signals.

In a normal state, a rotor of a step motor rotates in synchronization with a step pulse signal. However, if there is an overload or an abrupt change in speed, the synchronization between the step pulse signal and the rotation of the rotor is broken. This is known as step-out (or synchronization secession). Once stepped out, the step motor should undergo special processing so as to be normally driven, and thus, it is preferred to prevent the step motor from stepping-out.

In order to address the problem, in many cases, a motor driving circuit is designed to obtain an excessive output torque having a margin based on an anticipated maximum load, but loss of power is increased. Further, in order to detect a position of the rotor, a sensor is used or a vector is controlled by using a large scale digital calculation circuit such as an A/D converter, but in this case, cost is increased due to an increase in the number of components and a logical area is also increased.

SUMMARY

The present disclosure provides some embodiments of a driving circuit of a step motor capable of detecting a sign of step-out.

According to one embodiment of the present disclosure, there is provided a motor driving circuit for driving a step motor, including: a logical circuit synchronized with a step pulse signal to control a bridge circuit connected to a coil of the step motor and control electric power supplied to the coil of the step motor; a counter electromotive force detecting unit configured to detect a counter electromotive force generated between both ends of the coil; and a step-out predicting unit configured to assert a detection signal indicating a sign of step-out of the step motor, when the counter electromotive force detected at a detection time after the lapse of a time calculated by multiplying a predetermined coefficient to a length of a high impedance period of the coil since transition to the high impedance period is lower than a predetermined threshold voltage.

With this configuration, a state of having a small margin for step-out may be detected by comparing the counter electromotive force at the detection time of the high impedance period with the predetermined threshold voltage, thus detecting a sign of step-out.

"Detection time" may be any instantaneous time or may be a time interval from a certain time to a certain time.

When the detection signal is asserted, the logical circuit may increase a current flowing in the coil of the step motor.

Thus, since torque of the step motor can be increased before step-out occurs, step-out can be prevented in advance.

The motor driving circuit may further include a current limit circuit configured to limit the current flowing in the coil of the step motor such that the current is lower than a predetermined upper limit value. When the detection signal is asserted, the current limit circuit may increase the upper limit value.

With this configuration, in the driving circuit that controls torque of the motor by the current limit circuit, step-out can be prevented.

The current limit circuit may include a comparator configured to compare a current detection value indicating a current flowing in the coil with the upper limit value and generate a comparison signal asserted when the current exceeds the upper limit value. When the comparison signal is asserted, the logical circuit may generate a pulse modulation signal that transitions to have a first level, and thereafter, when a predetermined OFF time has lapsed, transitions to have a second level and drive switching of the bridge circuit based on the pulse modulation signal.

The motor driving circuit may further include a pulse modulator configured to generate a pulse modulation signal whose duty ratio is adjusted such that the current flowing in the coil of the step motor is identical to a target value. When the detection signal is asserted, the pulse modulator may increase the target value.

When the detection signal is asserted, a source voltage supplied to the bridge circuit may be increased.

Thus, since torque of the step motor can be increased before step-out occurs, step-out can be prevented in advance.

When the detection signal is asserted, a frequency of the step pulse signal may be lowered.

Thus, since torque of the step motor can be increased before step-out occurs, step-out can be prevented in advance.

When the detection signal is asserted, electric power supplied to the step motor may be controlled to increase torque of the step motor.

Thus, since torque of the step motor can be increased before step-out occurs, step-out can be prevented in advance.

The detection time may be located at a substantially center of the high impedance period.

The threshold voltage may be changed based on an RPM (Revolutions Per Minute) of the step motor.

The counter electromotive force generated in the coil is proportional to the RPM of the motor. Thus, appropriate torque may be set for each RPM by changing a threshold voltage according to each RPM.

The motor driving circuit may be integrated on a single semiconductor substrate in one-body integration type.

"One-body integration" refers to a case in which all of the components of a circuit are formed on a semiconductor substrate or major components of a circuit are integrated, and some resistors, capacitors, and the like may be installed outside of the semiconductor substrate in order to adjust a circuit constant. By integrating driving circuits into a single IC, a circuit area can be reduced and the characteristics of a circuit element can be also uniformly maintained.

According to another embodiment of the present disclosure, there is provided an electronic device. The electronic device includes a step motor; and a motor driving circuit according to one of the foregoing embodiments configured to drive the step motor.

In addition, any configuration of the foregoing components or any replacement of the components or representations of the present disclosure between methods, devices, systems, and the like may also be effective as embodiments of the present disclosure.

BRIEF DESCRIPTION OF THE DRAWINGS

FIG. 2 is a waveform view illustrating an operational sequence of the motor driving circuit.

FIGS. 4A and 4B are waveform views illustrating the operations of a current limit circuit.

DETAILED DESCRIPTION

Figure 1:
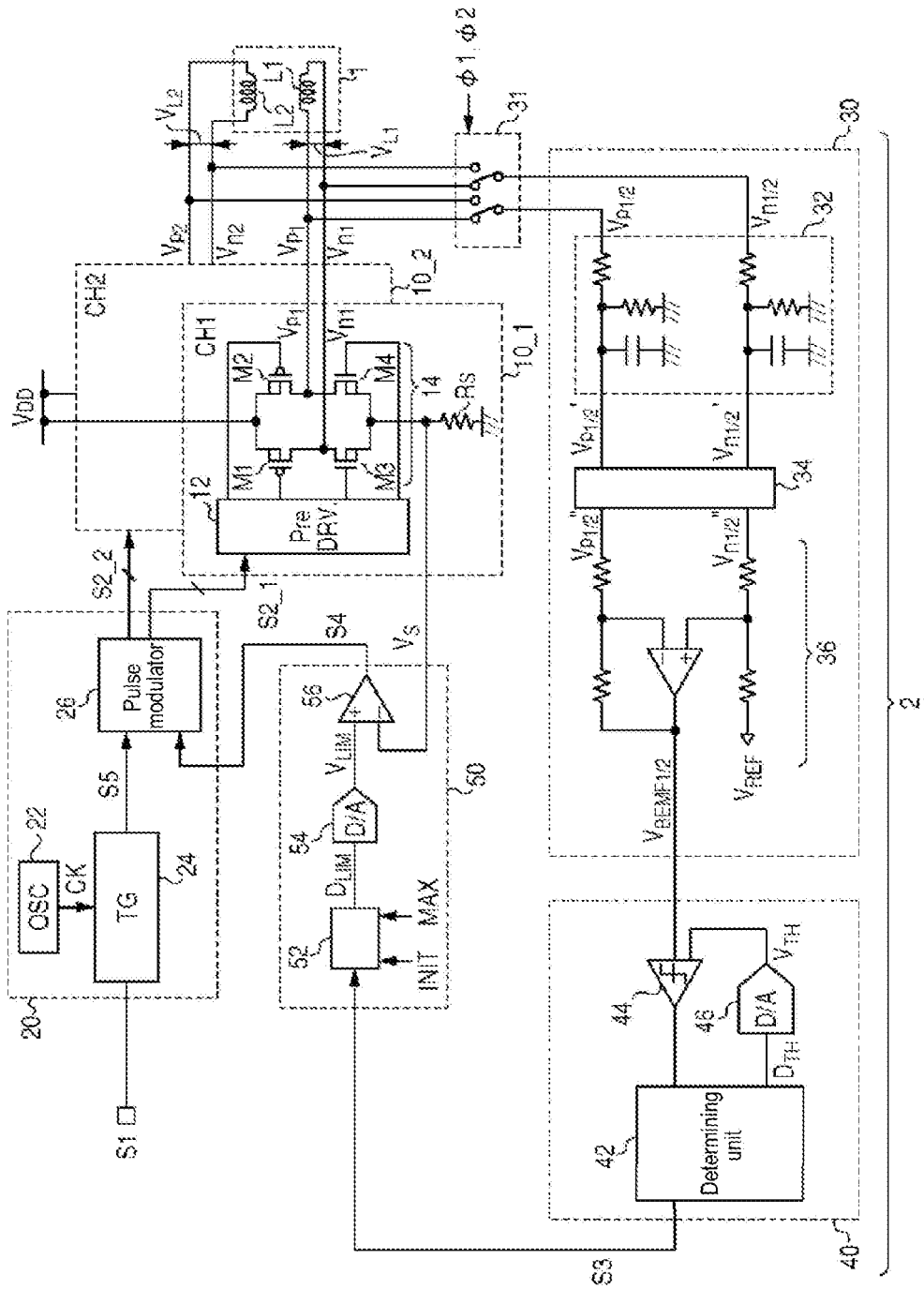
FIG. 1 is a circuit diagram illustrating a configuration of a motor driving circuit according to an embodiment of the present disclosure.

Hereinafter, embodiments of the present disclosure will be described in detail with reference to the drawings. In the drawings, like reference numerals are denoted for like or identical components, members, and processes throughout several drawings, and a repeated description will be omitted accordingly. Further, the embodiments do not limit the present disclosure but are illustrative, and all features described in the embodiments or any combination thereof are not necessarily considered to be essential.

In the present disclosure, a "state in which a member A and a member B are connected" includes a case in which the member A and the member B are indirectly connected through any other member that does not affect an electrical connection state, as well as a case in which the member A and the member B are physically directly connected.

Similarly, a "state in which a member C is installed between the member A and the member B" includes a case in which the member A and the member C or the member B and the member C are indirectly connected through any other member that does not affect an electrical connection state, as well as a case in which the member A and the member C or the member B and the member C are directly connected.

FIG. 1 is a circuit diagram illustrating a configuration of a motor driving circuit 2 according to an embodiment of the present disclosure. The motor driving circuit 2 drives a step motor 1. The step motor 1 may be a permanent magnet (PM)-type motor, a variable reluctance (VR)-type motor, or a hybrid (HB)-type motor.

The motor driving circuit 2 includes bridge circuits 10_1 and 10_2, a logical circuit 20, a counter electromotive force detecting unit 30, a step-out predicting unit 40, and a current limit circuit 50. The motor driving circuit 2 may be integrated on a single semiconductor substrate.

The step motor 1 is configured in a two channel structure including a first coil L1 and a second coil L2.

The bridge circuit 10_1 of a first channel CH1 is connected to the first coil L1 of the step motor 1. The bridge circuit 10_2 of a second channel CH2 is connected to the second coil L2 of the step motor 1.

The bridge circuits 10_1 and 102 each include a pre-driver 12, an H bridge circuit 14, a detection resistor Rs. The H bridge circuit 14 includes four transistors M1 to M4. The detection resistor Rs for detecting a coil current $I_{COIL1}$ flowing in the first coil L1 is installed between the H bridge circuit 14 and a ground line. The pre-driver 12 of the bridge circuit 10_1 drives the respective transistors M1 to M4 of the corresponding H bridge circuit 14 based on a driving signal S2_1 from the logical circuit 20, and switches a voltage $V_{L1}$ (also referred to as a first coil voltage) across the first coil L1.

The bridge circuit 102 has the same configuration as the bridge circuit 10_1. The pre-driver 12 of the bridge circuit 10_2 drives the corresponding H-bridge circuit 14 based on a driving signal S2_2 from the logical circuit 20 and switches a voltage $V_{L2}$ (also referred to a second coil voltage) across the second coil L2.

The logical circuit 20 receives a step pulse signal S1 indicating a rotational speed (synchronous speed) of the step motor 1. The logical circuit 20, which is synchronized with the step pulse signal S1, controls the bridge circuits 10_1 and $10_{13}$ 2, and controls a current (electric power) supplied to each of the first coil L1 and the second coil L2 of the step motor 1.

Specifically, the logical circuit 20 generates the driving signal S2_1 such that a phase (an electrical angle) of the coil current $I_{COIL1}$ flowing in the first coil L1 is changed by 45 degrees in 1-2 phase conversion in every predetermined edge of the step pulse signal S1. In the present disclosure, the number of the predetermined edges included in a unit time will be referred to as a pulse rate and a unit of the pulse rate will be indicated as pps (pulse per second). The predetermined edge that changes a waveform of the coil current $I_{COIL1}$ may be one of a positive edge and a negative edge, or both.

For example, the logical circuit 20 generates the driving signal S2_1 that repeats a first driving period, a first high impedance period, a second driving period, and a second high impedance period.

(1) First driving period (electrical angle: 0 to 135 degrees)
  The coil current $I_{COIL1}$ is allowed to flow to the first coil L1 in a first direction.
(2) First high impedance period Hi-z1 (electrical angle: 135 to 180 degrees) Both ends of the first coil L1 have high impedance.
(3) Second driving period (electrical angle: 180 to 315 degrees) The coil current $I_{COIL1}$ is allowed to flow to the first coil L1 in a second direction.
(4) Second high impedance period Hi-z2 (electrical angle: 315 to 360 degrees) Both ends of the first coil L1 have high impedance.

In the second channel CH2, a coil current $I_{COIL2}$ flowing in the second coil L2 is controlled to have a phase ahead or delayed by 90 degrees over the coil current $I_{COIL1}$. The logical circuit 20 generates the driving signal S2_2 that repeats a third driving period, a third high impedance period, a fourth driving period, and a fourth high impedance period in this order.

(1) Third driving period (electrical angle: 270 to 45 degrees) The coil current $I_{COIL2}$ is allowed to flow to the second coil L2 in the first direction.
(2) Third high impedance period Hi-z3 (electrical angle: 45 to 90 degrees) Both ends of the second coil L2 have high impedance.
(3) Fourth driving period (electrical angle: 90 to 225 degrees) The coil current $I_{COIL2}$ is allowed to flow to the second coil L2 in the second direction.
(4) Fourth high impedance period Hi-z4 (electrical angle: 225 to 270 degrees) Both ends of the second coil L2 have high impedance.

The logical circuit 20 includes an oscillator (OSC) 22, a timing generator (TG) 24, and a pulse modulator 26. The oscillator 22 generates a clock signal CK having a predetermined frequency. The timing generator 24, which is synchronized with the clock signal CK, generates a control signal S5 according to the step pulse signal S1. The pulse modulator 26 generates pulse-modulated driving signals S2_1 and S2_2 based on the control signal S5 from the timing generator 24.

FIG. 2 is a waveform view illustrating an operational sequence of the motor driving circuit 2. In FIG. 2, shown are the coil current $I_{COIL1}$ of the first coil L1, the coil current $I_{COIL2}$ of the second coil L2, a voltage $Vp_1$ of one end of the first coil L1, a voltage $Vn_1$ of the other end of the first coil L1, and positions of a rotor of the step motor 1 in order from the above. A relative relationship between a phase of a current and a position of the rotor is changed according to a load state or a pulse rate. FIG. 2 shows a case in which the delay of the rotor with respect to the coil currents is zero. It may be mentioned that the delay of the rotor is increased in corresponding to the load or the pulse rate and that when the delay exceeds 90 degrees, there is a high possibility of step-out.

The counter electromotive force detecting unit 30 detects a counter electromotive force $V_{BEMF1}$ corresponding to the first coil voltage $V_{L1}=Vp_1-Vn_1$ generated in the first coil L1 during the first and second high impedance periods Hi-z1 and Hi-z2 and detects a counter electromotive force $V_{BEMF2}$ corresponding to the second coil voltage $V_{L2}=Vp_2-Vn_2$ generated in the second coil L2 during the third and fourth high impedance periods Hi-z3 and Hi-z4.

In the present embodiment, the single counter electromotive force detecting unit 30 is shared by two channels CH1 and CH2. A channel selector 31 is in synchronization with the rotation of the step motor 1, and selects the first channel CH1 corresponding to the first coil L1 during the first and second high impedance periods Hi-z1 and Hi-z2 and selects the second channel CH2 corresponding to the second coil L2 during the third and fourth high impedance periods Hi-z3 and Hi-z4.

More specifically, the counter electromotive force detecting unit 30 detects counter electromotive forces $V_{BEMF1\_1}$ and $V_{BEMF1\_2}$ during the first and second high impedance periods Hi-z1 and Hi-z2 of the first coil L1, respectively.

Further, the counter electromotive force detecting unit 30 detects counter electromotive forces $V_{BEMF2\_1}$ and $V_{BEMF2\_2}$ during the third and fourth high impedance periods Hi-z3 and Hi-z4 of the second coil L2, respectively.

For example, the counter electromotive force detecting unit 30 includes a lowpass filter 32, a polarity changeover switch 34, and a differential amplifier 36. The lowpass filter 32 divides each of a pair of voltages $Vp_{1/2}$ and $Vn_{1/2}$ from the channel selector 31 and removes noise therefrom.

The polarity changeover switch 34 switches voltages $Vp_{1/2}'$ and $Vn_{1/2}'$ that have passed through the lowpass filter 32 such that the detected counter electromotive force $V_{BEMF1/2}$ has the same polarity (such that the detected counter electromotive force is greater than 0 ($V_{BEMF1/2}>0$) in this embodiment). The function of the polarity changeover switch 34 may be incorporated in the channel selector 31.

The differential amplifier 36 amplifies a difference between voltages $Vp_{1/2}''$ and $Vn_{1/2}''$ output from the polarity changeover switch 34, and generates the counter electromotive force $V_{BEMF1/2}$.

The step-out predicting unit 40 predicts step-out of the step motor 1 based on the counter electromotive forces $V_{BEMF1\_1}$ and $V_{BEMF1\_2}$ of the first coil L1 at detection times t1 and t2 each included in the first high impedance period Hi-z1 and the second high impedance period Hi-z2. Similarly, the step-out predicting unit 40 predicts step-out of the step motor 1 based on the counter electromotive forces $V_{BEMF2\_1}$ and $V_{BEMF2\_2}$ of the second coil L2 at detection times t3 and t4 each included in the third high impedance period Hi-z3 and the fourth high impedance period Hi-z4.

Specifically, in the high impedance period Hi-z1, when the counter electromotive force $V_{BEMF1\_1}$ at the detection time t1 after the lapse of a predetermined time τ since transition to the high impedance period Hi-z1 is lower than a predetermined threshold voltage $V_{TH}$, the step-out predicting unit 40 asserts a detection signal S3 indicating a sign of step-out of the step motor 1. The predetermined time τ is a time obtained by multiplying a predetermined coefficient to a length of the high impedance period. The predetermined coefficient may be, for example, ½. In this case, the detection time is located in a substantially center of the high impedance period.

In a similar manner, when the counter electromotive force $V_{BEMF1\_2}$ at the detection time t2 of the high impedance period Hi-z2 is lower than the threshold value $V_{TH}$, the step-out predicting unit 40 asserts the detection signal S3.

Also, in the high impedance period Hi-z3, when the counter electromotive force $V_{BEMF2\_1}$ at the detection time t3 after the lapse of the predetermined time τ since transition to the high impedance period Hi-z3 is lower than the threshold voltage $V_{TH}$, the step-out predicting unit 40 asserts the detection signal S3. Similarly, when the counter electromotive force $V_{BEMF2\_2}$ at the detection time t4 of the high impedance period Hi-z4 is lower than the threshold voltage $V_{TH}$, the step-out predicting unit 40 asserts the detection signal S3.

The step-out predicting unit 40 includes a determining unit 42, a comparator 44, and a D/A converter 46. The D/A converter 46 receives a digital command value $D_{TH}$ and converts the digital command value $D_{TH}$ into an analog threshold voltage $V_{TH}$. The comparator 44 compares the counter electromotive force $V_{BEMF1/2}$ from the counter electromotive force detecting unit 30 with the threshold voltage $V_{TH}$. The determining unit 42 measures a predetermined time τ2 and generates the detection times t1 to t4. Also, when an output from the comparator 44 indicates that the counter electromotive force $V_{BEMF1/2}$ is lower than the threshold voltage $V_{TH}$ at each of the detection times t1 to t4, the determining unit 42 asserts the detection signal S3 (e.g., a high level).

Immediately after the transition to the high impedance period, an accurate counter electromotive force cannot be detected because noise is contained in the voltages $V_{L1}$ and $V_{L2}$ in both ends of the coils L1 and L2. Thus, the detection times t1 to t4 may be set by avoiding a time immediately after the transition to the high impedance period Hi-z. Specifically, the detection times t1 to t4 may be set to those after the lapse of a certain time since the transition to the high impedance period Hi-z. In the present embodiment, the detection times t1 to t4 are set in substantially centers of the high impedance periods Hi-z1 to Hi-z4, respectively.

The detection signal S3 generated by the step-out predicting unit 40 may be used as a trigger of a sequence for preventing step-out of the step motor 1 by the motor driving circuit 2 itself. Alternatively, a sign of step-out may be notified by outputting the detection signal S3 to an external processor (not shown).

Next, a configuration for avoiding step-out will be described. When the detection signal S3 is asserted, the motor driving circuit 2 controls current (electric power) supplied to the step motor 1 to increase torque of the step motor 1 in order to prevent step-out thereof.

Specifically, when the detection signal S3 is asserted, the logical circuit 20 lowers the current $I_{COIL}$ flowing in the coils L1 and L2 of the step motor 1.

The motor driving circuit 2 illustrated in FIG. 1 has the current limit circuit 50 installed therein. The current limit circuit 50 limits the currents $I_{COIL1}$ and $I_{COIL2}$ flowing in the coils L1 and L2 of the step motor 1 not to exceed a predetermined upper limit value (also referred to as a reference peak current) $I_{LIM}$. When the detection signal S3 is asserted, the current limit circuit 50 increases the reference peak current $I_{LIM}$. The current limit circuit 50 is configured to set a maximum value $I_{LIM\_MAX}$ of the reference peak current $I_{LIM}$ from the outside, and changes the reference peak current $I_{LIM}$ within a range in which it does not exceed the maximum value $I_{LIM\_MAX}$. The current limit circuit 50 includes a current setting unit 52, a D/A converter 54, and a comparator 56.

The current setting unit 52 has a set value $D_{INIT}$ designating a normal value $I_{LIM\_NORM}$ of the upper limit value $I_{LIM}$ and a maximum value $D_{MAX}$ designating a maximum value $I_{LIM\_MAX}$ thereof, given in advance. Normally, the current setting unit 52 outputs an upper limit value $D_{LIM}$ identical to the set value $D_{INIT}$. The D/A converter 54 converts the upper limit value $D_{LIM}$ from the current setting unit 52 into an upper limit voltage $V_{LIM}$. In the detection resistor Rs, a voltage is dropped in proportion to the current $I_{COIL1}$ flowing in the first coil L1. The comparator 56 compares the detection voltage Vs generated in the detection resistor Rs with the upper limit voltage $V_{LIM}$ corresponding to the upper limit value $I_{LIM}$ of the coil current $I_{COIL}$, and generates a comparison signal S4 asserted when Vs is higher than $V_{LIM}$ (Vs>$V_{LIM}$).

When the comparison signal S4 is asserted, the logical circuit 20 generates a pulse modulation signal Sp that transitions to have a first level, and thereafter, when a predetermined OFF time $T_{OFF}$ has elapsed, transitions to have a second level. The first level corresponds to a state in which the H bridge circuit 14 is conducted, and the second level corresponds to a state in which the H bridge circuit 14 is not conducted. The logical circuit 20 generates the driving signals S2_1 and S2_2 based on the pulse modulation signal Sp. By this configuration, the current $I_{COIL1}$ flowing in the coil L1 is limited to below the upper limit current $I_{LIM}$ corresponding to the upper limit value $D_{LIM}$.

When the detection signal S3 is asserted, the current setting unit 52 increases the upper limit value $D_{LIM}$. Here, whenever the detection signal S3 is asserted, the current setting unit 52 may increase the upper limit value $D_{LIM}$ by a predetermined width.

Alternatively, when the detection signal S3 is asserted, the current setting unit 52 may increase the upper limit value $D_{LIM}$ to a maximum value $D_{MAX}$ thereof, and thereafter, whenever a predetermined time has lapsed, the current setting unit 52 may lower the upper limit value $D_{LIM}$ toward the set value $D_{INIT}$ in a stepwise manner.

So far, the configuration of the motor driving circuit 2 has been described. An operation of the motor driving circuit 2 will continue to be described.

Figure 3A:
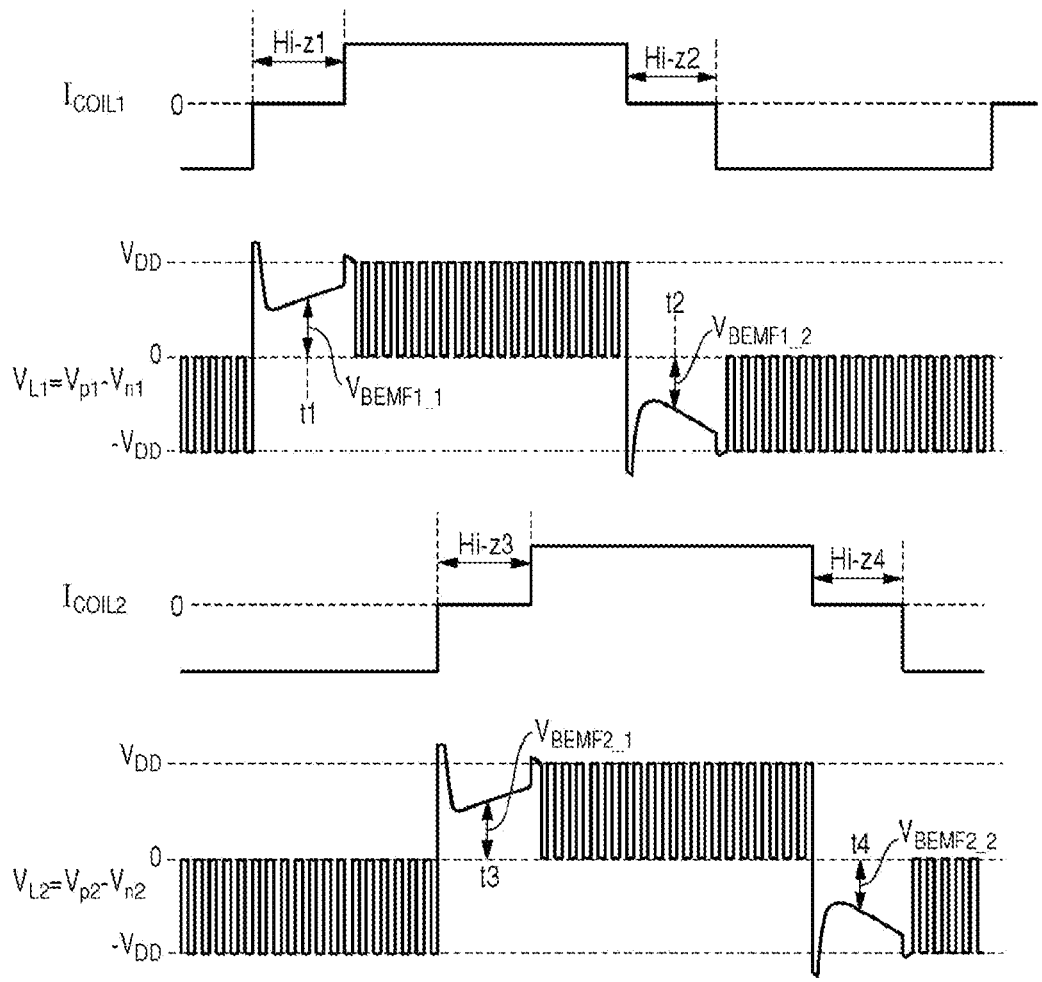
FIGS. 3A and 3B are waveform views illustrating the operations of the motor driving circuit of FIG. 1.
Figure 3B:
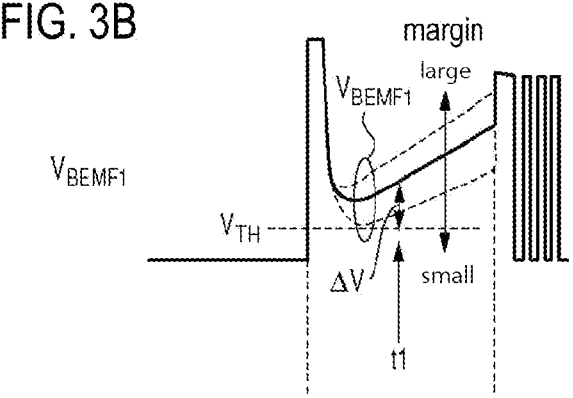

FIGS. 3A and 3B are waveform views illustrating the operations of the motor driving circuit 2 of FIG. 1.

FIG. 3A show the coil current $I_{COIL1}$, the first coil voltage $V_{L1}=Vp_1-Vn_1$, the coil current $I_{COIL2}$, and the second coil voltage $V_{L2}=Vp_2-Vn_2$ in order from the above. The counter electromotive forces $V_{BEMF1\_1}$, $V_{BEMF1\_2}$, $V_{BEMF2\_1}$, and $V_{BEMF2\_2}$ are detected at the detection times t1 to t4, respectively.

FIG. 3B shows a waveform of the first coil voltage VL1 in the first high impedance period Hi-z1. In a regeneration period immediately after transition to the high impedance period Hi-z1, the first coil voltage $V_{L1}$ bounces to $V_{DD}+V_F$. VF is a forward voltage of body diodes of switching transistors M1 and M2. Thereafter, the first coil voltage $V_{L1}$ corresponding to the counter electromotive force $V_{BEMF1}$ of the first coil L1, is increased over time. Here, the counter electromotive force $V_{BEMF1}$ observed in the high impedance period Hi-z1 has a high voltage level when a step-out margin is large, and has a low voltage level when the step-out margin is small. That is, a potential difference $\Delta V=V_{BEMF1\_1}-V_{TH}$ between the counter electromotive force $V_{BEMF1\_1}$ in the predetermined detection time t1 of the high impedance period and the predetermined threshold voltage $V_{TH}$ indicates a magnitude of the step-out margin. The motor driving circuit 2 of FIG. 1 may detect a sign of step-out by comparing the counter electromotive force $V_{BEMF1\_1}$ with the threshold voltage $V_{TH}$.

When the counter electromotive force $V_{BEMF}$ becomes lower than the threshold voltage $V_{TH}$, torque of the step motor 1 may be increased to prevent step-out in advance. In the case of the motor driving circuit 2, if the step-out margin is reduced due to insufficient torque of the step motor 1, the torque of the step motor 1 is automatically increased. Thus, there is no need to provide an excessive margin to the torque of the step motor 1, and current consumption (power consumption) in a normal operation state of the step motor 1 can be reduced.

Specifically, in the motor driving circuit 2 according to the present embodiment, torque may be increased by increasing the upper limit value $I_{LIM}$ of the current of the current limit circuit 50.

FIGS. 4A and 4B are waveform views illustrating the operation of the current limit circuit 50. As illustrated in FIG. 4B, the driving signals S2_1 and S2_2 are modulated such that the current $I_{COIL1}$ flowing in the coil L1 does not exceed the upper limit value $I_{LIM}$, and the H bridge circuit 14 performs switching.

As illustrated in FIG. 4A, when the detection signal S3 is asserted, the upper limit value $I_{LIM}$ of the current is increased to the maximum value $I_{LIM\_MAX}$. As a result, a high level period of the driving signal S2_1 (S2_2), that is, a current flow time of the coil L1 (L2) is lengthened to increase an average value of the coil current $I_{COIL1}$ ($I_{COIL2}$), thereby increasing the torque of the step motor 1. Therefore, step-out can be prevented.

Figure 5A:
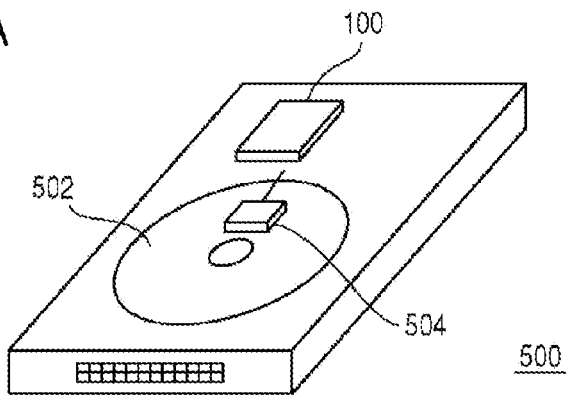
FIGS. 5A to 5C are perspective views illustrating examples of an electronic device including the motor driving circuit.
Figure 5B:
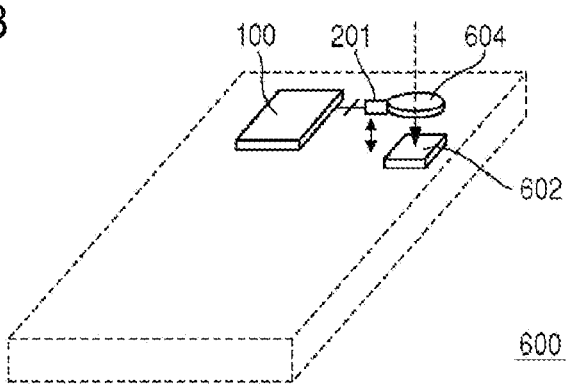
Figure 5C:
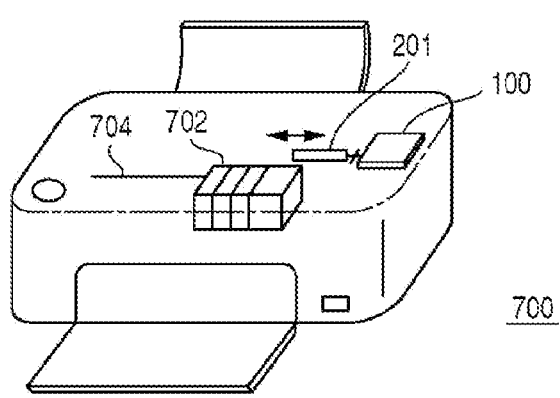

Finally, an application of the motor driving circuit 2 will be described. The motor driving circuit 2 is used in various electronic devices. FIGS. 5A to 5C are perspective views illustrating electronic devices each including the motor driving circuit 2.

The electronic device of FIG. 5A is an optical disk device 500. The optical disk device 500 includes an optical disk 502 and a pickup 504. The pickup 504 is installed to write data to the optical disk 502 and read data therefrom. The pickup 504 is actuated (tracking) on a record surface of the optical disk 502 in a radial direction of the optical disk 502. Also, a distance between the pickup 504 and the optical disk 502 is variable (focusing). A position of the pickup 504 is determined by a step motor (not shown). The motor driving circuit 2 controls the step motor. According to this configuration, step-out can be prevented and a position of the pickup 504 can also be determined with a high degree of precision.

The electronic device of FIG. 5B is a device 600 having an image capturing function, such as a digital camera, a digital video camera, or a mobile telephone terminal. The device 600 includes an image capturing element 602 and an autofocusing lens 604. The step motor 201 determines a position of the autofocusing lens 604. In the configuration in which the motor driving circuit 2 drives the step motor 201, a position of the autofocusing lens 604 can be determined with a high degree of precision, while preventing step-out. Besides the autofocusing lens, the motor driving circuit 2 may be used to drive a lens for optical image stabilization (OIS).

The electronic device of FIG. 5C is a printer 700. The printer 700 includes a head 702 and a guide rail 704. The head 702 is supported to be positioned along the guide rail 704. The step motor 201 controls a position of the head 702. The motor driving circuit 2 controls the step motor 201. According to this configuration, a position of the head 702 can be determined with a high degree of precision, while preventing step-out. Besides the function of driving the head 702, the motor driving circuit 2 may also be used to drive a motor for a paper transfer mechanism.

So far, the present disclosure has been described on the basis of the embodiment. This embodiment, however, is merely illustrative and a person skilled in the art will understand that combinations of the respective components and respective processes may be variously modified and such modifications are within the scope of the present disclosure. Hereinafter, such modifications will be described.

<First Modification>

In the embodiment, the case in which the upper limit value (peak value) of the coil current is controlled by the current limit circuit 50 has been described. However, the present disclosure is not limited thereto and a general pulse modulator 26 may be installed instead of the current limit circuit 50. The pulse modulator 26 generates a pulse modulation signal whose duty ratio is adjusted such that an average value of the currents $I_{COIL1}$ and $I_{COIL2}$ flowing in the coils L1 and L2 of the step motor 1 is identical to a target value. The logical circuit 20 controls the bridge circuit 10 based on the pulse modulation signal.

Here, when the detection signal S3 is asserted, the pulse modulator 26 may increase the target value. Accordingly, torque can be temporarily increased to prevent step-out.

<Second Modification>

When the detection signal S3 is asserted, the motor driving circuit 2 may increase a source voltage $V_{DD}$ supplied to the bridge circuit 10. Accordingly, torque can be temporarily increased to prevent step-out.

<Third Modification>

When the detection signal S3 is asserted, the motor driving circuit 2 may lower a frequency, that is, a pulse rate, of the step pulse signal S1. In a case in which the step pulse signal S1 is given by an external processor, the motor driving circuit 2 may output the detection signal S3 to the processor and the processor may lower the pulse rate when the detection signal S3 is asserted. By lowering the pulse rate, RPM of the step motor 1 may be temporarily reduced to increase torque, thus preventing step-out.

<Fourth Modification>

In the embodiment, the case in which an output terminal of the bridge circuit 10 is configured as a full bridge circuit (bridged transless) has been described, but the present disclosure is not limited thereto and the output terminal of the bridge circuit 10 may be configured as a half-bridge circuit.

<Fifth Modification>

In the embodiment, the case in which the threshold voltage $V_{TH}$ is constant has been described, but the threshold voltage $V_{TH}$ may be changed according to the RPM of the step motor 1. More specifically, the threshold voltage $V_{TH}$ may be changed to be proportional to the RPM of the step motor 1.

The counter electromotive force $V_{BEMF}$ generated in the coil of the step motor 1 is proportional to the RPM of the step motor 1. Thus, appropriate torque may be set for each RPM by changing the threshold voltage $V_{TH}$ according to the RPM.

<Sixth Modification>

In the embodiment, the case in which the counter electromotive forces $V_{BEMF1}$ and $V_{BEMF2}$ of the coils L1 and L2 are each monitored and step-out is predicted has been described, but the present disclosure is not limited thereto and only one of them may be detected. In this case, the channel selector 31 is not necessary.

<Seventh Modification>

In the embodiment, a sign of step-out is detected based on the counter electromotive force in each of the first high impedance period Hi-z1 and the second high impedance period Hi-z2, but only one of them may be detected. Similarly, a sign of step-out may be detected based on only any one of the counter electromotive forces $V_{BEMF}$ in the third high impedance period Hi-z3 and the fourth high impedance period Hi-z4.

<Eighth Modification>

In the embodiment, the case in which the detection times are disposed at the centers of the high impedance periods has been described, but the present disclosure is not limited thereto.

The predetermined coefficient may be approximately ½ to ¾.

Alternatively, the predetermined coefficient may be an arbitrary value within a range not exceeding 1. In this case, the detection time may be a time immediately before each high impedance period terminates.

<Ninth Modification>

Each counter electromotive detection period may be generated as follows.

A period Tp of the step pulse signal S1 is measured by using a clock signal. When a predetermined integer is N, a time at which a time duration Tp/N has lapsed since transition to the high impedance period Hi-z may be determined as a detection time.

Figure 6:
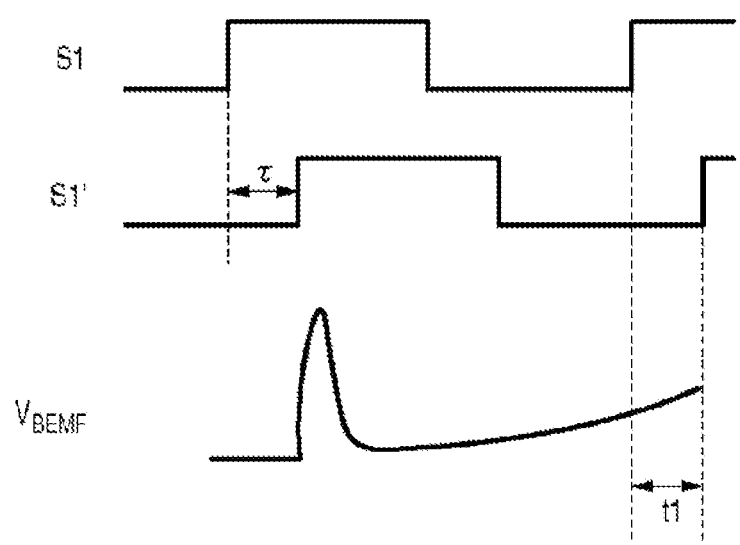
FIG. 6 is a waveform view illustrating an example of a method for generating a detection section.

FIG. 6 is a waveform view illustrating an example of a method for generating a detection time. A replica S1' is generated by delaying the step pulse signal S1 by a delay time τ. The delay time τ may be constant, or it may be controlled to be proportional to the period of the step pulse signal S1. And, a driving period and a high impedance period are changed in synchronization with the replica S1' of the step signal. In the high impedance period Hi-z in which a counter electromotive force is to be detected, a period from an edge (here, a positive edge) of the original step pulse signal S1 to an edge (positive edge) corresponding to the replica S1' of the step signal may be determined as a detection time t1 (t2).

According to some embodiments of the present disclosure, it is possible to detect a sign of step-out before step-out occurs.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driving circuit for driving a step motor, comprising:
    a logical circuit synchronized with a step pulse signal to control a bridge circuit connected to a coil of the step motor and control electric power supplied to the coil of the step motor;
    a counter electromotive force detecting unit configured to detect a counter electromotive force generated between both ends of the coil; and
    a step-out predicting unit comprising:
        a first comparator which compares the counter electromotive force with a threshold voltage; and
        a determining unit which outputs a detection signal based on a comparison result signal from the first comparator,
    wherein the step-out predicting unit is configured to assert the detection signal indicating a sign of step-out of the step motor, when the counter electromotive force detected at a detection time is lower than the threshold voltage, is the detection time being after a lapse of a time, that is calculated by multiplying a predetermined coefficient to a length of a high impedance period of the coil, from transition to the high impedance period.

2. The motor driving circuit of claim 1, wherein when the detection signal is asserted, the logical circuit decreases a current flowing in the coil of the step motor.

3. The motor driving circuit of claim 2, further comprising:
    a current limit circuit configured to limit the current flowing in the coil of the step motor such that the current is lower than a upper limit value,
    wherein when the detection signal is asserted, the current limit circuit is configured to increase the upper limit value.

4. The motor driving circuit of claim 3, wherein the current limit circuit includes a second comparator configured to compare a current detection value indicating a current flowing in the coil with the upper limit value and generate a comparison signal asserted when the current exceeds the upper limit value, and
    when the comparison signal is asserted, the logical circuit is configured to generate a pulse modulation signal that transitions to have a first level, and thereafter, when a predetermined OFF time has lapsed, transitions to have a second level and drive switching of the bridge circuit based on the pulse modulation signal.

5. The motor driving circuit of claim 2, further comprising:
    a pulse modulator configured to generate a pulse modulation signal whose duty ratio is adjusted such that the current flowing in the coil of the step motor is identical to a target value,
    wherein when the detection signal is asserted, the pulse modulator is configured to increase the target value.

6. The motor driving circuit of claim 2, wherein when the detection signal is asserted, a source voltage supplied to the bridge circuit is increased.

7. The motor driving circuit of claim 1, wherein when the detection signal is asserted, a frequency of the step pulse signal is lowered.

8. The motor driving circuit of claim 1, wherein when the detection signal is asserted, electric power supplied to the step motor is controlled to increase torque of the step motor.

9. The motor driving circuit of claim 1, wherein the detection time is located at a center portion of the high impedance period.

10. The motor driving circuit of claim 1, wherein the threshold voltage is changed based on an RPM (Revolutions Per Minute) of the step motor.

11. The motor driving circuit of claim 10, wherein the threshold voltage is changed to be proportional to the RPM of the step motor.

12. The motor driving circuit of claim 1, wherein the motor driving circuit is integrated on a single semiconductor substrate.

13. An electronic device, comprising:
    a step motor; and
    a motor driving circuit according to claim 1 configured to drive the step motor.

14. A method for driving a step motor, comprising:
    controlling, with a logical circuit synchronized with a step pulse signal, a bridge circuit connected to a coil of the step motor and controlling electric power supplied to the coil of the step motor, in synchronization with a step pulse signal;
    detecting, with a counter electromotive force detecting unit, a counter electromotive force generated between both ends of the coil in a high impedance period of the coil;
    comparing, a first comparator, the counter electromotive force with a threshold voltage;
    outputting, from a determining unit, a detection signal based on a comparison result signal based on the comparing the counter electromotive force with a threshold voltage; and
    asserting, with a step-out predicting unit comprising the first comparator and the determining unit, the detection signal indicating a sign of step-out of the step motor, when the counter electromotive force detected at a detection time is lower than the threshold, the detection time being after a lapse of a predetermined time from transition to the high impedance period.

15. The method of claim 14, further comprising:
    when the detection signal is asserted, controlling electric power supplied to the step motor to increase torque of the step motor.

* * * * *